United States Patent [19]

Arnall et al.

[11] Patent Number: 5,352,065
[45] Date of Patent: Oct. 4, 1994

[54] ROCK BOLTING

[75] Inventors: Peter D. Arnall, Merewether; Rataj Mieczyslaw, Newcastle, both of Australia

[73] Assignee: The Ani Corporation Ltd., Bennetts Green, Australia

[21] Appl. No.: 871,560

[22] Filed: Apr. 21, 1992

[30] Foreign Application Priority Data

Apr. 26, 1991 [AU] Australia .................. PK5839

[51] Int. Cl.⁵ .................. E21D 21/02; F16B 31/00
[52] U.S. Cl. .................. 405/259.2; 405/259.6; 411/3; 411/8
[58] Field of Search .............. 405/259.1, 259.2, 259.4, 405/259.5, 259.6; 411/2, 3, 5, 8-10

[56] References Cited

U.S. PATENT DOCUMENTS

| | | | |
|---|---|---|---|
| 3,460,428 | 8/1969 | Charles | 411/2 |
| 3,979,918 | 9/1976 | Vidler | 405/259.2 X |
| 4,122,681 | 10/1978 | Vass et al. | 405/259.2 X |
| 4,295,761 | 10/1981 | Hansen . | |
| 4,347,020 | 8/1992 | White . | |
| 4,611,954 | 9/1986 | Cassidy | 411/5 X |
| 4,618,291 | 10/1986 | Wright . | |
| 4,662,795 | 5/1987 | Clark . | |
| 5,064,312 | 11/1991 | Calandra et al. | 405/259.5 |

*Primary Examiner*—David H. Corbin
*Attorney, Agent, or Firm*—Townsend and Townsend Khourie and Crew

[57] ABSTRACT

A drive nut (3,7) for a rock bolt, incorporating a nut (7) with a crimped protrusion (9), and an insert (3). The protrusion is crimped to form a plurality of lips (8) adapted to retain insert (3) in the head of the nut (7), the crimping being effected by a pressing tool having a number of preferably square bars. By this crimping technique, the drive nut (3,7) can be fabricated in such a way that the breaking torque required to expel the insert (3) from the nut (7) can be limited to a predetermined range.

16 Claims, 4 Drawing Sheets

FIG. 5R.

ROCK BOLTING

BACKGROUND OF THE INVENTION

This invention relates to improvements in rock bolting, more particularly to a drive nut, i.e. a combination nut and removable insert adapted for use with a rock bolt.

The rock bolting art used in underground mining operations its well developed and various nuts for use with rock bolts have been previously proposed and used. Relevant prior art materials include U.S. Pat. Nos. 4,708,550 (Australian equivalent patent No. 538338), 4,295,761, 3,979,918 (Australian equivalent patent No. 487989) and Australian patent No. 539084.

Briefly, a roof of an underground mine is secured, using the rock bolting technique, by the insertion into the roof of a series of rock bolts spaced apart the appropriate distance to accommodate the particular roof material being secured. Each rock bolt is inserted by first drilling a hole in the roof to accommodate the bolt, then inserting in the hole a container of resin. The bolt is then driven into the hole to puncture the walls of the resin container and mix the resin to secure the bolt in the hole once the resin has set. A drive nut (with a displaceable insert) is used firstly at the end of the bolt where it rotates with the bolt and remains threaded to the end of the bolt until the mixed resin components set. Thereafter a further torque is applied to the nut, sufficient to rotate the nut relative to the now fixed bolt, thus ejecting the insert from the nut which is run along the bolt to firmly affix a plate washer to the mine roof.

Breaking torque of the nut with the displaceable insert (known in the art as a drive nut) is critical and the breaking torque range required for some conditions may be relatively narrow.

The main factors which determine required breaking torque of the drive nut are:

type of roof bolting equipment being used, i.e. capabilities of the motor (its torque output)
amount of resin being used per rock bolt
viscosity of the resin
length of the rock bolt.

For example, breaking torque of the drive nut has an upper limit for some equipment which must not be so high that the machine will not break the drive nut and a lower limit to prevent premature breaking of the drive nut which would result in the resin not being mixed properly and/or the bolt being pulled out of the hole by tightening of the nut prior to setting of the resin.

Typical breaking torque ranges required for standard M24 drive nuts are as follows:

120–150 Nm
90–120 Nm
65–90 Nm
45–65 Nm
35–45 Nm

Consistency of the breaking torque of the drive nut is of first importance.

The prior art exhibits many drive nuts useful in the rock bolting art but no currently Known nut and insert combination has proven entirely satisfactory. For example, a nut with a plastics sleeve and wedge insert forced into the threaded portion thereof has been used but has been found unsatisfactory in practice since control of breaking torque has been difficult. A nut with a metal insert located in the threaded part of the nut has been tried but thread damage to the nut has resulted when the metal on metal contact between nut thread and insert has been broken under torque. Further, a nut having a resin plug insert formed by pouring settable resin into the nut has been proposed and used but again, completely accurate estimation of breaking torque force has been difficult, variations arising from such difficult control variables as different bolt end shapes and plug thickness.

In particular, the nut and insert combination of U.S. Pat. No. 4,295,161 has been tested extensively and has proven to be unsatisfactory for various reasons. Breaking torque of the nut has not been consistent and greatly depends on the shape of the bolt end. The shape of the bolt end varies due to the way the round bar is sheared (prior to thread rolling) during the manufacturing process. The main factors affecting the shear mode are the sharpness and clearance of the shear blades. It is obviously difficult to maintain these two parameters as constants. A second and more important factor affecting the bolt end shape is the bar steel quality. High tensile steel bar is more brittle and will result in a quite different end shape when compared with a mild steel bar. Steel quality will also affect the shape of the bolt end during thread rolling. The end of the mild steel bolt will have a rim created by the steel being "pushed" by the thread rollers whereas a high tensile steel bolt would tend to be more "square". Thus the shape of the bolt end is practically beyond control. Typical bolt ends are depicted in FIG. 1 of the accompanying drawings. It will be noted that prior art U.S. Pat. No. 4,295,761 incorporates a bolt with a frangible thin cylindrical disk adapted to be normally retained in the cavity in the head of the nut. The variation of the breaking torque of the nut with the flat insert, resulting from variations in bolt end shape, was simply too great to allow the nut and insert combination of U.S. Pat. No. 4,295,761 to be effective and acceptable. Typically, bolt end shapes of FIGS. 1C and 1D would result in breaking torque 30–40 percent lower than that experienced with the bolt end shape depicted in FIG. 1A.

A further very significant shortcoming of the nut and flat insert combination as proposed in U.S. Pat. No. 4,295,761 resides in the fact that during extrusion of the insert from the nut, the start of the thread on the bolt is damaged with the result that a second nut cannot be screwed onto the bolt. A second nut is often threaded onto a rock bolt underground to fix some mining gear, such as ventilation equipment, pipes, cables, etc. The thread damage on the bolt occurs most noticeably when a high torque nut (90–120 Nm) with a flat insert is used in conjunction with a mild steel bolt. This arises since the flat insert when extruded from the nut forms a cap which rubs against the thread damaging the thread start. Occasionally the cap "sticks" to the end of the bolt very firmly (i.e. cannot be removed by hand), which also prevents the second nut from being screwed onto the rock bolt.

It is an object of this invention to provide an improved drive nut for use with a rock bolt. It is desirable to reduce the contact area between the insert and the bolt when the nut and insert combination is threaded onto a bolt, so that the rim on the bolt end (FIG. 1B) has no adverse affect on the breaking torque. The insert useful in the drive nut of this invention incorporates a peripheral rim and a central portion displaced relative to the plane of the rim so that first contact between a drive nut and a bolt to which the nut is threaded, is with the insert central portion. The peripheral rim of the insert is preferably annular but may be of any other suitable shape such as hexagonal, duodecagonal, etc. Further, the insert shaped in accordance with this invention is much stiffer than conventional flat inserts allowing for relatively uniform force distribution across the insert and thus shapes shown in FIGS. 1C and 1D do not affect the torque either. Clearly there can no longer, with the novel insert of this invention, be any damage to the bolt thread since there is no contact between the thread and the insert. Further, the novel insert of this invention does not "stick" to the bolt since it is never capped.

The current invention provides improvement in respect of the configuration of the nut to which this invention relates. Prior art U.S. Pat. No. 4,295,761 incorporates a protrusion in the head of the nut and the insert is placed in the recess provided by this protrusion and held therein by a crimped protrusion lip. This way of crimping of the nut protrusion has been found unsatisfactory since small variations in the crimping force will result in significant change in the breaking torque of the drive nut. The nut of this invention is forged including an integral upstanding protrusion which incorporates a recess adapted for location therein of an insert. When the insert is located in the recess, the protrusion is crimped to retain the insert in the head of the nut, that crimping being effected preferably by pressing the protrusion by a pressing tool having a number of preferably square bars. These bars press the material (steel) of the protrusion, pushing it over the insert, forming a plurality of lips to hold the insert in the nut. These "lips" are separated in the crimped protrusion by successive portions of the original protrusion which are not crimped to the same extent as the "lips". Typically, six lips of 4 mm width and 1.8 mm depth will result in 90–110 Nm breaking torque whereas the same configuration but a different depth of the lips (achieved by providing a different load in the assembling press) of 1.5 mm will lead to a breaking torque of 70–90 Nm, using a high tensile steel insert. It will be apparent to the man skilled in the art that the same torque ranges can be achieved by different combinations between the number, shape and dimensions of the lips. Torque ranges can also be adjusted by differing materials and thickness of the insert.

BRIEF DESCRIPTION OF THE DRAWINGS

FIGS. 6A and 6B to FIGS. 11A and 11B depict, firstly without and secondly with inserts, a number of alternative embodiments of nuts according to this invention.

DESCRIPTION OF THE PREFERRED EMBODIMENTS

Figure 1A:
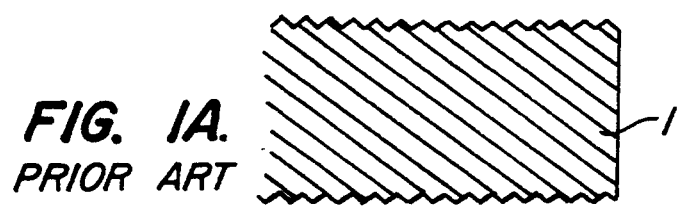
FIGS. 1A–1D depict typical bolt end shapes.
Figure 1B:
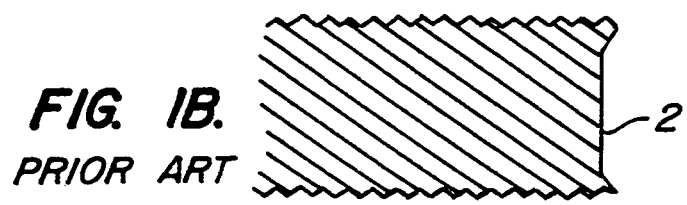
Figure 1C:
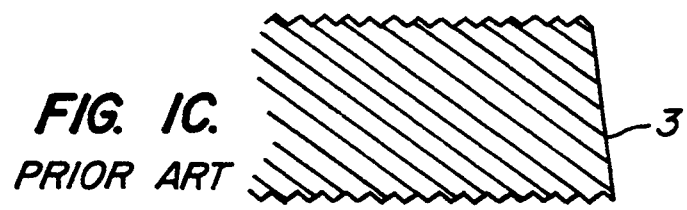
Figure 1D:
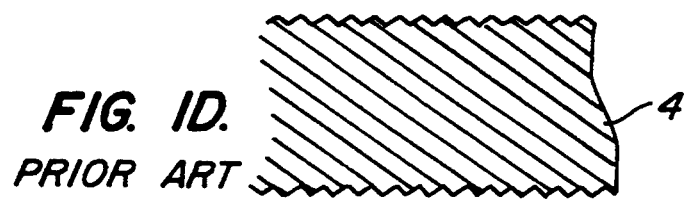
Figure 10A:
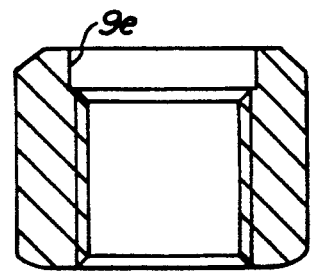
Figure 10B:
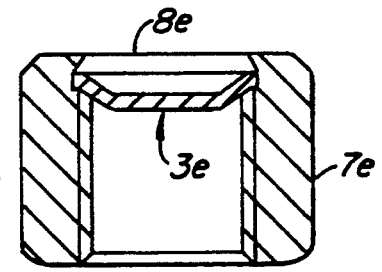
Figure 11A:
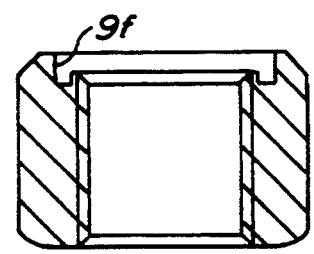
Figure 11B:
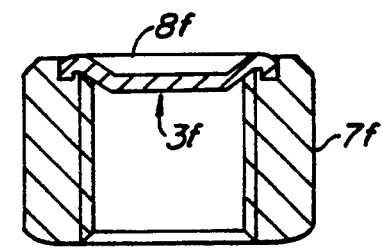

FIGS. 1A to 10 depicts four typical rock bolt ends, in FIG. 1A the rock bolt end 1 is substantially planar and is normal to the axis of the bolt; in FIG. 1B the rock bolt end 2 is indented with an internal section substantially planar and normal to the axis of the bolt; in FIG. 1C the rock bolt end 3 is substantially planar but slanted relative to the axis of the bolt; in FIG. 10 the end of the bolt is irregular.

Figure 2A:
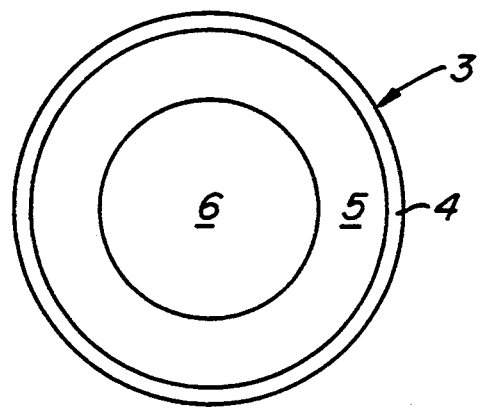
FIGS. 2A and 2B depict in plan and in section a preferred insert according to this invention with dimensions shown on the section drawing.
Figure 2B:
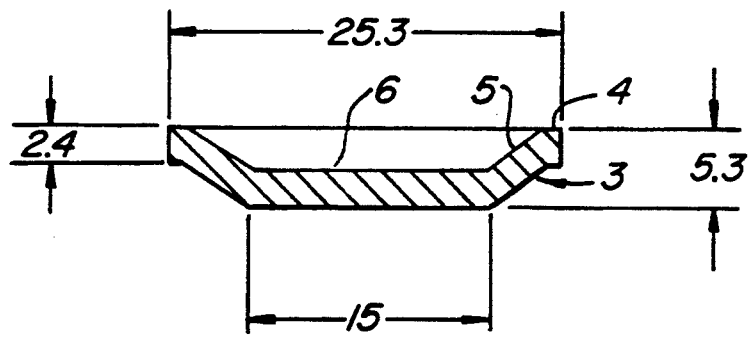
Figure 5A:
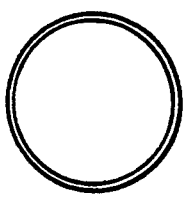
FIGS. 5A–5R depict nine alternative embodiments of inserts according to this invention.
Figure 5B:
Figure 5C:
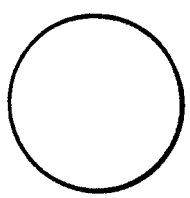
Figure 5D:
Figure 5E:
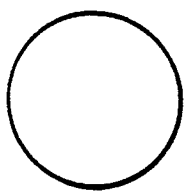
Figure 5F:
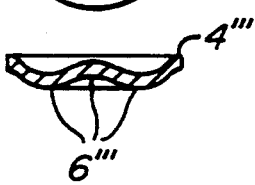
Figure 5G:
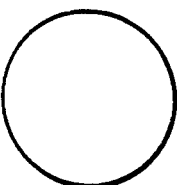
Figure 5H:
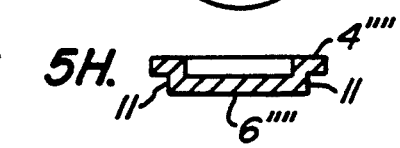
Figure 5I:
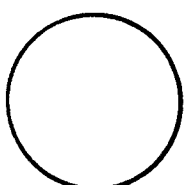
Figure 5J:
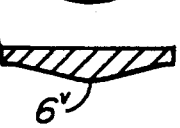
Figure 5K:
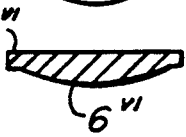
Figure 5L:
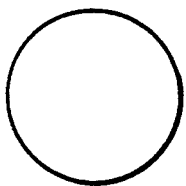
Figure 5M:
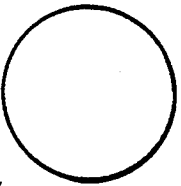
Figure 5N:
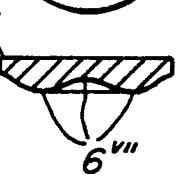
Figure 5O:
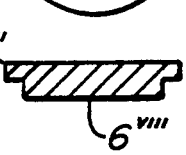
Figure 5P:
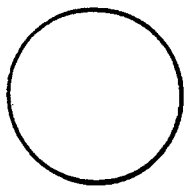
Figure 5Q:
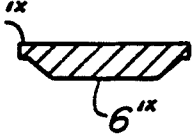

The preferred insert 3 of this invention is depicted in FIGS. 2A and 2B and incorporates annular peripheral rim 4, recessed cylindrical central portion 6 and ramp portion 5. Typical dimensions are provided in FIG. 2B.

Figure 4:
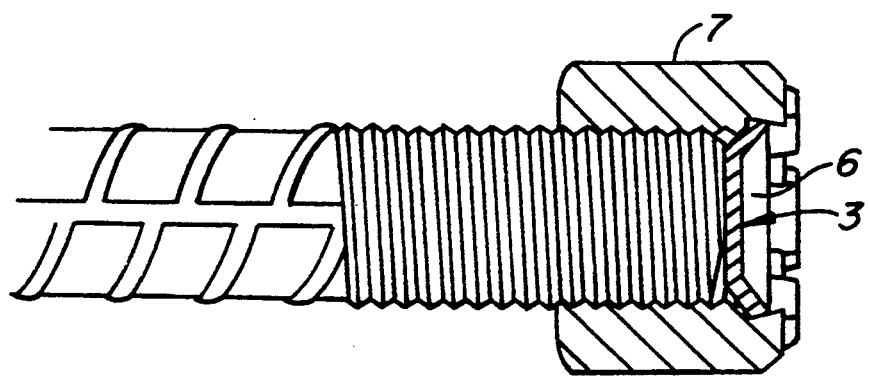
FIG. 4 depicts the drive nut combination of FIG. 3 located on a bolt end.
Figure 3C:
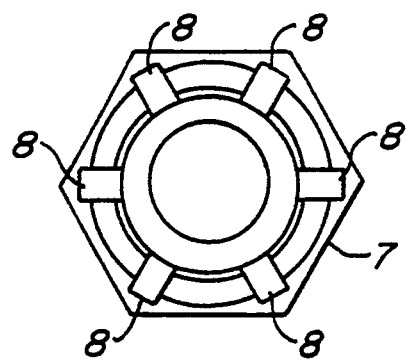
FIGS. 3A–3C depict a preferred nut, firstly in plan view and secondly in section, the first section drawing incorporating dimensions of the nut before the insert is located therein, the second section drawing depicting the combination of nut and insert (drive nut)
Figure 3A:
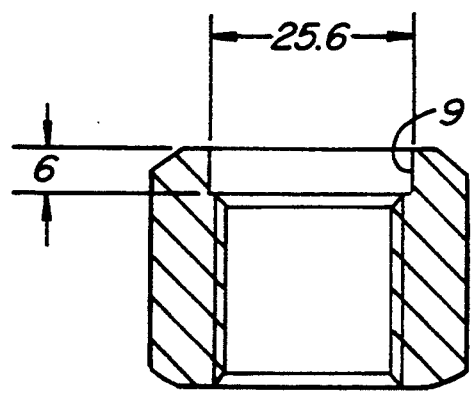
Figure 3B:
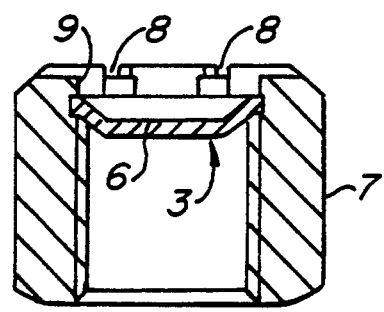

Nut 7 (FIGS. 3A to 3C) incorporates walls of protrusion 9 defining recess into which insert 3 is located, together with lips 8 crimped from the protrusion 9 to hold insert 3 in its location in said recess. A nut 7 and insert 3 combination (drive nut) as depicted in section in FIG. 3 is shown in FIG. 4 with the nut threaded to bolt end and the insert central portion 6 in contact with the bolt end which is such as that depicted at 3 in FIG. 1C.

Various preferred embodiments of insert 3 are depicted in FIGS. 5A to 5H wherein part (i) shows a substantially V-shaped insert having annular peripheral rim 4' with recessed central portion 6'; part (ii) depicts insert 3 having annular peripheral rim portion 4" with arcuate central recess portion 6"; part (iii) depicts an insert 3 having annular peripheral rim portion 4''' with doubly arcuate central portion 6'''; and part (Iv) depicts insert 3 with annular peripheral rim portion 4'''' and cylindrical recess central portion 6'''' with stepped portion 11 integral therewith. A further series of inserts 3 are depicted in FIGS. 5I to 5R. These inserts differ from those of FIG. 5 in that the central portion $6^v$–$6^{ix}$ is somewhat thicker than the corresponding central portions 4' to 4'''' of the inserts of FIGS. 5A to 5H. It will be noted that in each of the inserts of FIGS. 5I to 5R, the upper surface is substantially planar but the central portion $6^v$–$6^{ix}$ extends vertically below the plane of the peripheral rim portion of each respective insert in similar manner to the central portions of the inserts of FIGS. 5A to 5H.

Figure 6A:
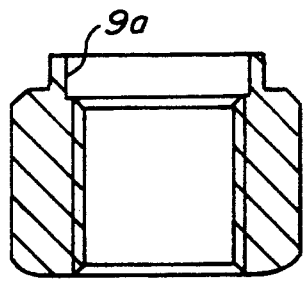
Figure 6B:
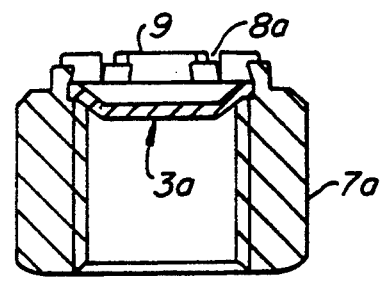
Figure 7A:
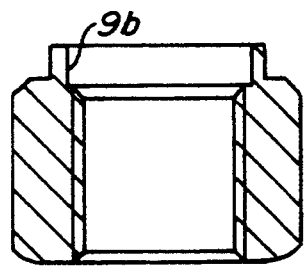
Figure 7B:
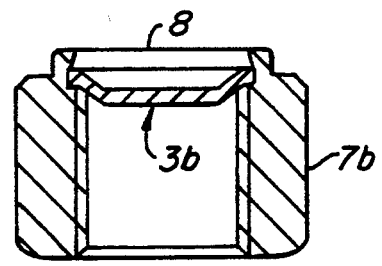
Figure 8A:
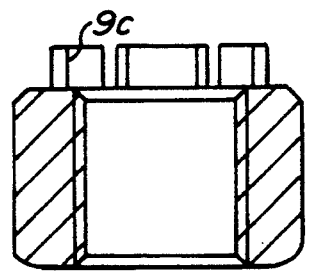
Figure 8B:
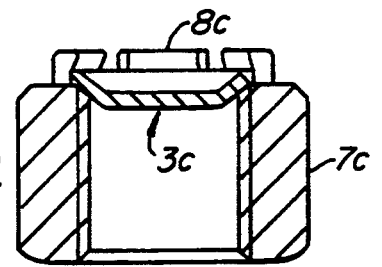
Figure 9A:
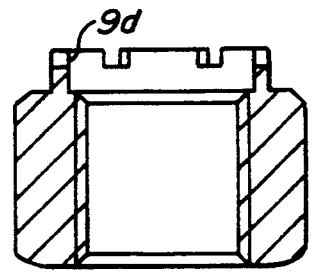
Figure 9B:
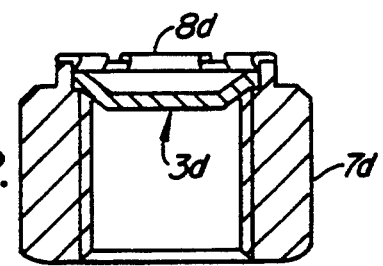

FIGS. 6A and 6B to FIGS. 11A and 11B depict a variety of alternative nuts each of which falls within the scope of this invention. Further, for each nut (a) to (f) the corresponding nut and insert combination is depicted. Drive nut 6(a) (i.e. including inserts) is formed by the preferred method described above wherein the protrusion 9 is crimped by square bars to form lips 8 which retain insert 3 in nut 7. The nuts of FIG. 7A and 7B to FIG. 11A and 11B are assembled in different ways, principally by forming the lips by crimping the protrusion 9 using a dome shaped die. It will be appreciated that the drive nuts of FIG. 6 are merely exemplary. Many further drive nuts can be formed by incorporating any one of the inserts of FIGS. 5A to 5R with a nut such is that depicted in FIGS. 3A to 3C with Its protrusion crimped in any suitable manner to form the appropriate lip (8).

I claim:

1. A drive nut for a rock bolt, said drive nut comprising:
   a nut having a head forming a recess; and
   an insert;
   the nut having a plurality of lips retaining said insert in the recess in the head of said nut, said plurality of lips being formed from a protrusion, said plurality of lips extending inwardly over the insert when the insert is positioned in the recess to limit a breaking torque of the drive nut to a predetermined range, said plurality of lips being sized and configured to displace and release said insert from said recess upon application of said breaking torque within said predetermined range;

the insert being dish-shaped with a narrow peripheral annular rim and a relatively wide diameter planar central portion displaced relative to the plane of said rim so that a first contact between a bolt to which said drive nut is threaded, and said insert, is with said insert central portion, the insert being located solely between the lips and the bottom of said recess out of contact with threads of the nut.

2. A drive nut as defined in claim 1 wherein said plurality of lips are formed by crimping said protrusion by a pressing tool including a plurality of bars.

3. A drive nut as defined in claim 2 wherein said bars are square in section.

4. A drive nut as defined in claim 1 wherein said lips are formed by crimping said protrusion by a dome shaped die.

5. A drive nut as defined in claim 1 wherein:

said central portion is cylindrical and said rim and said central portion are joined by an integral ramp portion of said insert, said insert having a substantially constant thickness throughout the rim and central portion.

6. A drive nut as defined in claim 1 wherein said insert is of substantially V-shaped section.

7. A drive nut as defined in claim 1 wherein said insert is of doubly-arcuate section.

8. A drive nut as defined in claim 1 wherein said central portion is cylindrical and said rim and said central portion are joined by an integral annular portion stepped form said rim.

9. A drive nut as defined in claim 1 wherein said insert has a planar top surface and the central portion has a greater thickness than the peripheral rim portion, so that first contact between a bolt to which said drive nut is threaded is with the central portion of the insert.

10. A drive nut as defined in claim 1 wherein said insert peripheral rim is annular and said central portion is cylindrical.

11. A drive nut as defined in claim 9 wherein an under surface of the insert is of V-shaped section.

12. A drive nut as defined in claim 9 wherein said insert has an under surface which is arcuate in section.

13. A drive nut as defined in claim 9 wherein said insert has an under surface which is doubly arcuate in section.

14. A drive nut as defined in claim 9 wherein said insert has an under surface which is frusto-conical in section.

15. (Previously Amended) A drive nut as defined in claim 1 incorporating an even number of said lips.

16. A drive nut for a rock bolt, said drive nut comprising:

a nut; and an insert;

the nut having a plurality of lips retaining said insert in a recess in a head of said nut, said plurality of lips extending inwardly over the recess when the insert is positioned in the recess to limit the breaking torque of the drive nut to within a predetermined range, said plurality of lips being sized and configured to displace and release said insert from said recess upon application of said breaking torque within said predetermined range; and the insert having peripheral rim and a central portion displaced relative to said rim so that a first contact between bolt to which said drive nut is threaded, and said insert, is with said central portion, the insert having a substantially constant thickness and being out of contact with threads of the nut.

* * * * *